(12) United States Patent
Jones et al.

(10) Patent No.: US 7,915,761 B1
(45) Date of Patent: Mar. 29, 2011

(54) POWER INJECTOR DETECTION

(75) Inventors: Chad Jones, Doylestown, OH (US); Corey Metsker, Clinton, OH (US)

(73) Assignee: Cisco Technology, Inc., San Jose, CA (US)

( * ) Notice: Subject to any disclaimer, the term of this patent is extended or adjusted under 35 U.S.C. 154(b) by 1218 days.

(21) Appl. No.: 11/535,923

(22) Filed: Sep. 27, 2006

(51) Int. Cl.
*H02J 1/10* (2006.01)

(52) U.S. Cl. ............................................. 307/52
(58) Field of Classification Search .............. 307/52
See application file for complete search history.

(56) References Cited

U.S. PATENT DOCUMENTS

| | | | |
|---|---|---|---|
| 4,782,355 A * | 11/1988 | Sakai et al. | 396/72 |
| 2005/0125507 A1 | 6/2005 | Atias et al. | |
| 2005/0197094 A1 | 9/2005 | Darshan et al. | |
| 2006/0171399 A1 | 8/2006 | Ferentz et al. | |
| 2006/0181817 A1 | 8/2006 | Ohana et al. | |

* cited by examiner

*Primary Examiner* — Robert L. DeBeradinis
(74) *Attorney, Agent, or Firm* — Tucker Ellis & West LLP

(57) ABSTRACT

In one embodiment, a signal detector is coupled to an external power source. The signal detector is configured to ascertain whether a predetermined signal was received from the external power source. Control logic is coupled to the signal detector and to the external power source. The control logic is responsive to the signal detector to determine a characteristic of the external power source based on whether the signal detector detected the predetermined signal. The characteristics of the external power supply can be determined based on the frequency, amplitude and duration of a signal received from the power injector. This enables the control logic to determine the power available from an unknown power supply and to configure a device to operate accordingly.

23 Claims, 4 Drawing Sheets

Injector Tone, 10V/div, 20ms/div, reference at -40V

POWER INJECTOR DETECTION

BACKGROUND

In many applications, it is desirable to know the characteristics of an unknown source of power. For example, a device may need to know the amount of power available from an unknown power supply so it can determine whether the power is sufficient to operate the device and/or to adjust the operating characteristics of the device so that the operational configuration of the device corresponds to the characteristics of the power source.

As an example of the aforementioned problem, next generation access points (APs) are expected to draw more power than the 13 W allowed by the International Electrical and Electronic Engineer's (IEEE) 802.3 specification. Accordingly, a new midspan power injector is being developed to provide this extra power.

BRIEF DESCRIPTION OF THE DRAWINGS

The accompanying drawings incorporated in and forming a part of the specification, illustrate embodiments of the present invention, and together with the description serve to explain the principles of the invention.

DESCRIPTION OF EXAMPLE EMBODIMENTS

Figure 1:
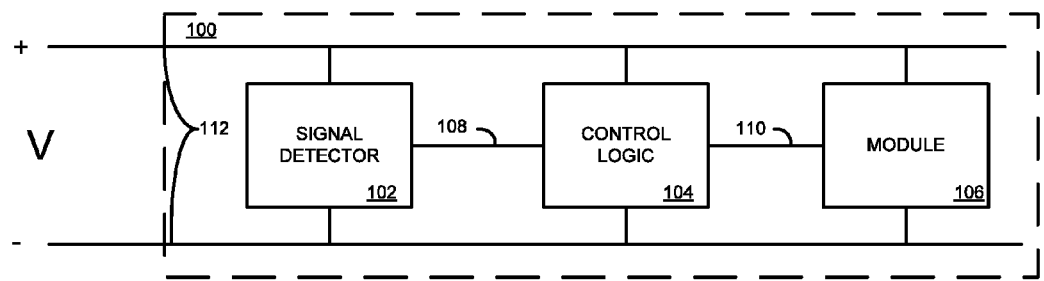
FIG. 1 illustrates an example system for power injector detection.

The embodiments illustrated and described herein are but examples and do not limit the scope of the present invention, as claimed. The figures generally indicate the features of example embodiments, where it is understood and appreciated that like reference numerals are used to refer to like elements.

There is described herein a system and method for power injector detection. In a preferred embodiment, during the initial power phase, once the voltage rail has reached full amplitude, the rail is forced to send a discovery tone (e.g. oscillate) for a fixed period. For example, the discovery tone can be a 6 volt, 500 Hz signal sent for 100 milliseconds (msec). For example, if the output of the power injector is 56V, then the output of the injector actually oscillates between 50V and 56V for 100 msec after power up. By detecting whether the discovery tone is sent, a device can determine the type and/or characteristics of an unknown power supply connected to the device. This can enable the device to configure itself accordingly. Also, the frequency, amplitude, duration and/or any other characteristic of the tone signal (e.g. phase) can be varied to advertise the operating characteristics (e.g. maximum power, voltage, current, power factor etc.) of the power supply. In a preferred embodiment, the tone amplitude will be 6V peak to peak, within a 15% tolerance, the tone will have a frequency of 500 Hz with a 15% tolerance and the tone will have a duration of 100 msec with a 15% tolerance.

FIG. 1 illustrates an example system 100 for power injector detection. System 100 comprises inputs 112 for receiving power from an external power source. For example, inputs 112 can receive power from a Power over Ethernet (PoE) connection, a DC 'brick' (with corresponding positive "+" and negative or ground "−" inputs) or an AC signal. In addition to receiving power from an external power source, as will be described herein, system 100 is configured for power injector detection.

Signal detector 102 receives power from inputs 112. Signal detector 102 is configured to ascertain whether a predetermined signal from the external power source is present. The predetermined signal may be identified by such characteristics as frequency, amplitude, duration and/or the time period the signal is received from the external power source via inputs 112. Furthermore, if the predetermined signal is present, characteristics of the predetermined signal, including but not limited to, frequency, amplitude, duration, and/or time period of the signal may be varied to advertise the properties of the external power source (e.g. maximum power, operating voltage, operating current, power factor, etc.).

Control logic 104 is coupled to signal detector 104 via path 108 and the external power source via inputs 112. Control logic 104 is responsive to signal detector 102 to determine a characteristic of the external power source based on whether the signal detector detected the predetermined signal. For example, if the predetermined signal is not detected, then control logic 104 can assume the external power source is a legacy power source. If the predetermined signal is detected, control logic 104 can assume the external power source has a certain predetermined characteristic.

In an example embodiment, signal detector 102 determines whether the predetermined signal is present during a predetermined time period. This is beneficial because continuously impressing the predetermined signal (tone) by the power supply can introduce noise into system 100, which is undesirable. In a preferred embodiment, signal detector 102 determines whether the predetermined signal is present during a time period immediately after power is supplied, for example within the first 100 msec.

Control logic 104 is coupled to at least one module 106 via path 110. Control logic 104 is operable to provide power to module 106 based on whether signal detector 102 detects the predetermined signal, which signal detector 102 communicates to control logic 104 via path 108. For example, control logic 104 can provide full power to module 106 if the predetermined signal is detected, can provide partial power to module 106 if the predetermined signal is not detected, or can deactivate system 100 if the predetermined signal is not detected.

As an example, system 100 can suitably comprise an access point (AP) that receives power from a distribution network via power over Ethernet (PoE). Power from the PoE source is supplied by a DC voltage that is received on inputs 112. Signal detector 102 then determines whether a predetermined signal (tone) is received during a predetermined time period, such as within the first 100 msec of power being provided from the external PoE source (commonly referred to as a midpan injector). Signal detector 102 sends the results of whether the tone was detected via path 108 to control logic 104. Module 106 may suitably comprise a plurality of wireless transceivers (e.g. radio frequency "RF," infra-red "IR," and/or optical). Based on whether the tone was received, control logic 104 determines which of the wireless transceivers in module 106 are provided with power. For example, if the tone is received, then control logic 104 assumes the external power source (e.g. midspan injector) has sufficient capacity to power all of the wireless transceivers in module 106 and accordingly is operable to have power provided to all of the wireless transceivers in module 106.

However, if the tone was not detected, then control logic 104 can assume the external power source is a legacy power source and select an operating mode appropriate for a lower power source. For example, control logic may select only one or more of the plurality of wireless transceivers in module 106 to be powered or reduce the functionality of the plurality of wireless transceivers in module 106. Other alternatives include, but are not limited to, reducing radio transceiver TX power, reducing data link rates (e.g. enabling Ethernet at 100 Mbit/s as opposed to 1 Gbit/s), reducing CPU rates (either in main system CPU or transceiver local processors) which limits system data throughput, and/or deactivating system 100.

Figure 2:
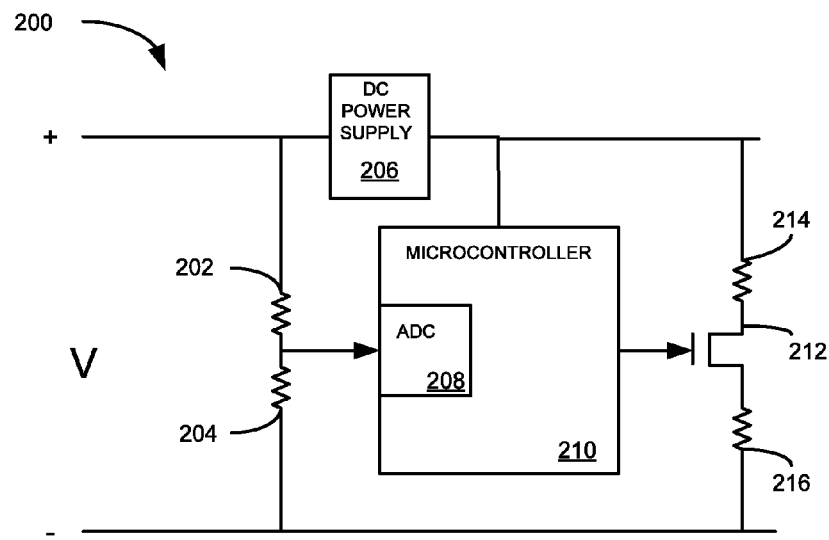
FIG. 2 illustrates an example signal detector.

FIG. 2 illustrates an example of a signal detector 200. Signal detector 200 is suitable to perform the functionality of signal detector 102 (FIG. 1). A resistive network comprising resistors 202 and 204 are coupled between the input voltage terminals (+) and (−). DC Power Supply 206 is coupled to the external power supply and is operative to provide power when power is being supplied by the external power supply. DC power supply 206 provides power to microcontroller 210 and analog to digital converter (ADC) 208.

In operation, the values of resistors 202 and 204 are selected so that the input of ADC 208 is at a desired level, such as within the operational range of ADC 208. ADC 208 converts the predetermined signal (tone) to a suitable level for Microcontroller 210.

In a preferred embodiment, a controllable switching device (transistor) 212 is coupled to microcontroller 210. A resistance comprising resistors 214, 216 is coupled to transistor 212. Power supply 206 provides power to resistors 214, 216 and transistor 212. Transistor 212 switches on to conduct current responsive to a signal from microcontroller 210. Microcontroller 210 can be configured to switch on transistor 210 while ascertaining whether the predetermined signal is present and switch off the transistor 210 when not ascertaining whether the predetermined signal is present. Switching on transistor 210 has the effect of lowering the input resistance of signal detector 200.

Figure 3:
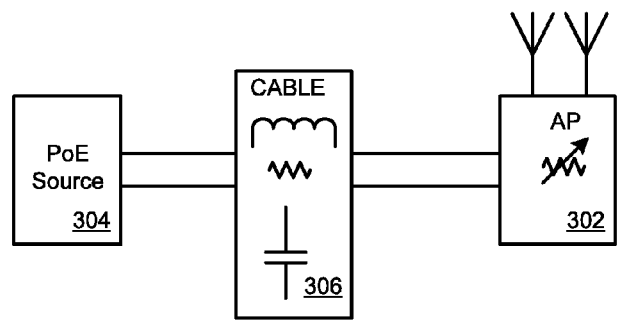
FIG. 3 illustrates an example AP receiving power from a Power over Ethernet source.

Lowering the input resistance of signal detector 200 is desirable for maximizing signal current. Also, it is desirable to provide a constant load to prevent distorting the signal. For example, referring to FIG. 3, there is illustrated an example of an AP 302 receiving power from a Power over Ethernet (PoE) source 304. Cable 306 coupling PoE source 304 to AP 302 has an inductance, capacitance and resistance, which as the length of the cable increases can be significant, and filter (distort) the predetermined signal. AP 302 has a variable resistance, which can be lowered while trying to detect the predetermined signal (e.g. by turning on transistor 212 is using a signal detector configured like signal detector 200) to minimize distortion.

Figure 4:
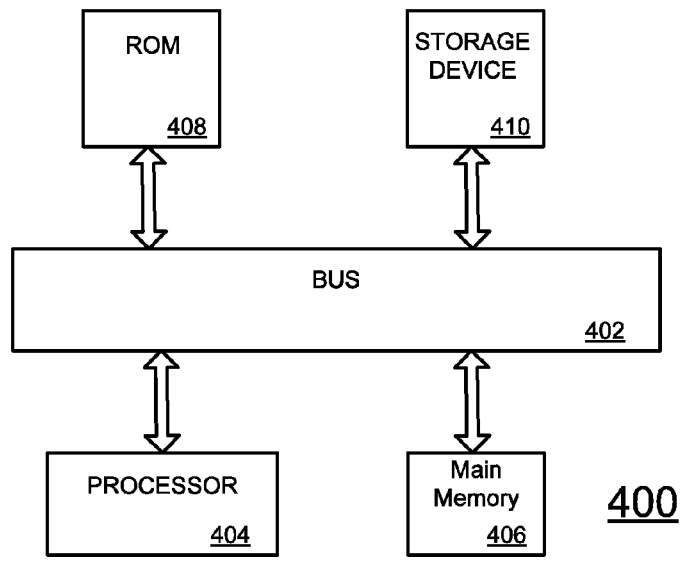
FIG. 4 illustrates example control logic.

FIG. 4 illustrates an example of a computer system 400 capable for performing the functionality of control logic 104 (FIG. 1) and/or the functionality of microcontroller 210 (FIG. 2). Computer system 400 includes a bus 402 or other communication mechanism for communicating information and a processor 404 coupled with bus 402 for processing information. Computer system 400 also includes a main memory 406, such as random access memory (RAM) or other dynamic storage device coupled to bus 402 for storing information and instructions to be executed by processor 404. Main memory 406 also may be used for storing a temporary variable or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 can be used for Power Injector Detection. According to one embodiment of the invention, Power Injector Detection is provided by computer system 400 in response to processor 404 executing one or more sequences of one or more instructions contained in main memory 406. Such instructions may be read into main memory 406 from another computer-readable medium, such as storage device 410. Execution of the sequence of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to non-volatile media, volatile media, and transmission media. Non-volatile media include for example optical or magnetic disks, such as storage device 410. Volatile media include dynamic memory such as main memory 406. Transmission media include coaxial cables, copper wire and fiber optics, including the wires that comprise bus 402. Transmission media can also take the form of acoustic or light waves such as those generated during radio frequency (RF) and infrared (IR) data communications. Common forms of computer-readable media include for example floppy disk, a flexible disk, hard disk, magnetic cards, paper tape, any other physical medium with patterns of holes, a RAM, a PROM, an EPROM, a FLASHPROM, any other memory chip or cartridge, a carrier wave as described hereinafter, or any other medium from which a computer can read.

Various forms of computer-readable media may be involved in carrying one or more sequences of one or more instructions to processor 404 for execution. For example, the instructions may initially be borne on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406 from which processor 404 retrieves and executes the instructions. The instructions received by main memory 406 may optionally be stored on storage device 410 either before or after execution by processor 404.

Figure 5:
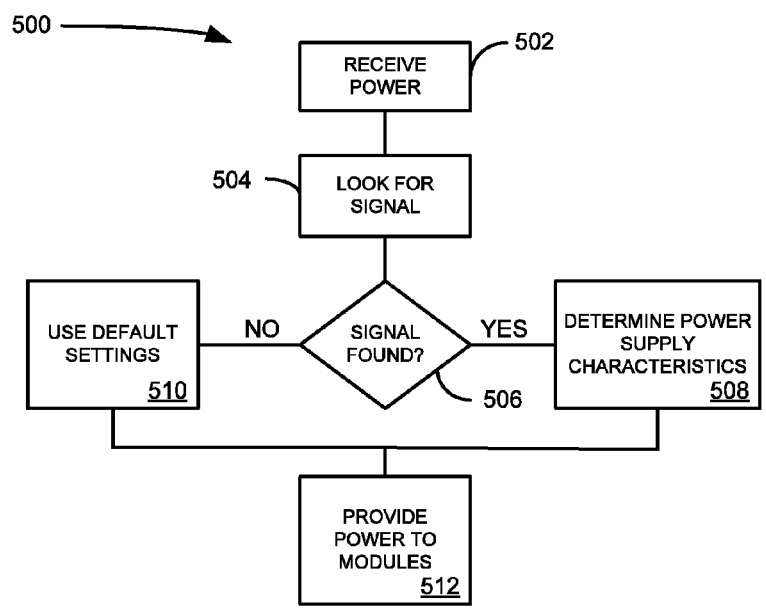
FIG. 5 illustrates an example methodology for Power Injector Detection.

In view of the foregoing structural and functional features described above, a methodology will be better appreciated with reference to FIG. 5. While, for purposes of simplicity of explanation, the methodology of FIG. 5 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology. Embodiments of the present invention are suitably adapted to implement the methodology in hardware, software, or a combination thereof.

FIG. 5 illustrates an example methodology 500 for Power Injector Detection. At 502, power is received from the injector. The power may be received by any physical realizable manner. At 504, an attempt is made to detect a predetermined signal (e.g. a tone signal). The tone signal can have any predetermined characteristics such as a predetermined frequency (e.g. 500 Hz), a predetermined amplitude (e.g. 6V), a predetermined duration (e.g. 100 msec), and/or a predetermined time period (e.g. within 100 msec of when power is received).

At 506, it is determined whether the predetermined signal was detected. If the signal was detected (YES) then at 508 the power supply characteristics are determined. For example, in a preferred embodiment, the detection of a 500 Hz, 6V peak-to-peak, 100 msec signal can be indicative of a power supply capable of supplying over 30 W and operating at 56V. Moreover, any one (or more) of the signal parameters (e.g., frequency, amplitude, duration, etc) can be varied to indicate specific characteristics of the power supply. For example, the amplitude can be indicative of the power supply's maximum power capacity and the frequency can be indicative of the power supply's voltage (or current) level.

If at 506 it is determined that the predetermined signal was not found (NO), then at 510 default settings can be used. For example, if the predetermined signal is not found, it can be assumed that a legacy power injector is supplying power and the voltage, current and/or power characteristics of the legacy power supply are used.

At 512, power is provided to at least one module. The number or operating parameters of the at least one module is responsive to the power supply characteristic determined at 508 or the default settings from 510. For example, if the device is a wireless access point (AP) with a plurality of wireless transceivers, if at 506 the predetermined signal was not detected, the AP activates a lower number of wireless transceiver, or operates the wireless transceivers at lower power levels than if the predetermined signal was detected.

Figure 8:
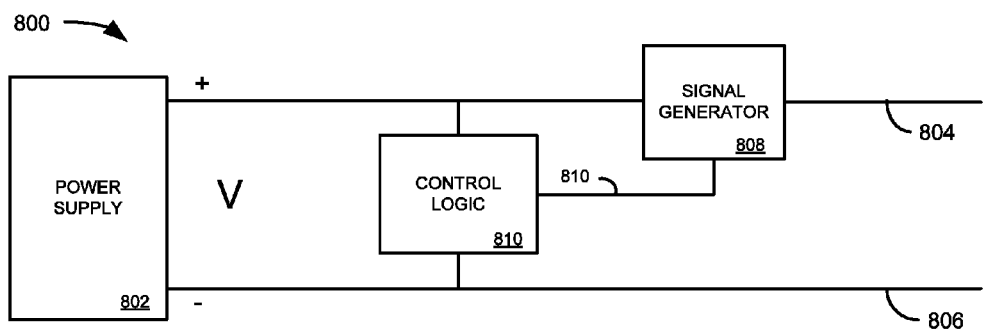
FIG. 8 illustrates an example circuit for generating a power injector discovery tone signal.

FIG. 8 illustrates an example of a circuit 800 for generating a power injector discovery tone signal. The power injector discovery tone signal is used to advertise the operating characteristics of the power supply. The system 800 comprises a power source (power supply) 802 that provides the power. Power is supplied to a device via conductors 804, 806. Signal generator 808 produces a predetermined signal (e.g. a tone) indicative of a characteristic of power supply 802. Signal generator 808 is operably coupled to and controlled by control logic 810. Control logic 810 and signal generator 808 receive power from power supply 802.

In operation, control logic 810 operates signal generator 808 to send a tone signal. In one embodiment, the tone frequency, amplitude, and duration are fixed, and control logic 810 merely switches signal generator 808 on and off. While signal generator 808 is switched off, the signal from power supply 802 is passed through unchanged. In another embodiment, control logic 810 is operable to control the frequency, amplitude, duration, etc. of the signal sent by signal generator 808. For example, control logic 810 can switch signal generator on 808 once power supply 802 has reached its rated voltage and have signal generator 808 generate a signal with predetermined characteristics.

Figure 6:
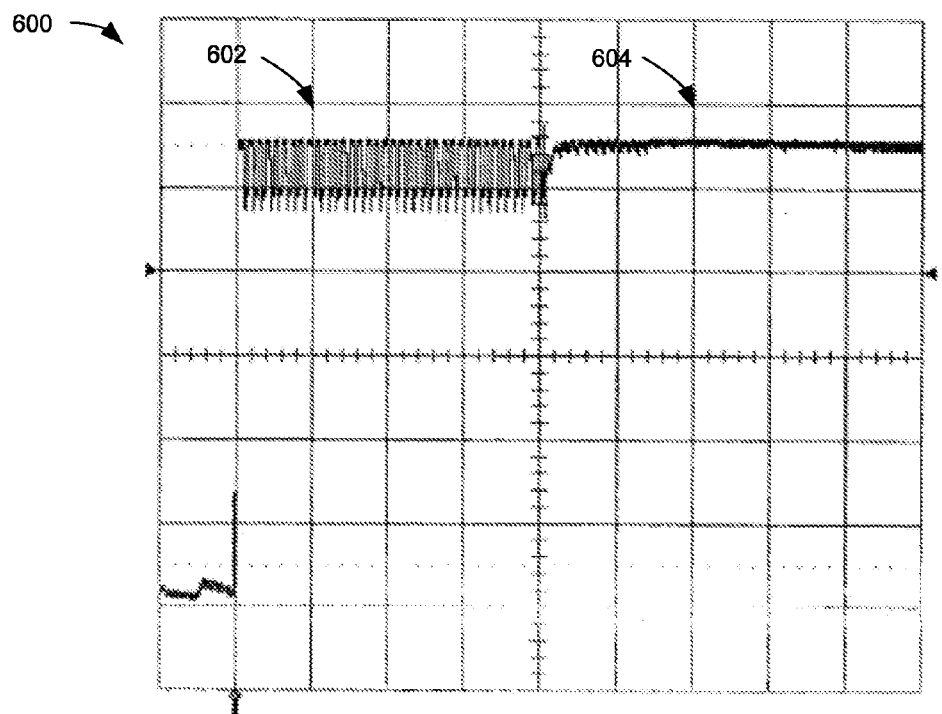
FIG. 6 illustrates an example power signal with an injector tone.
Figure 7:
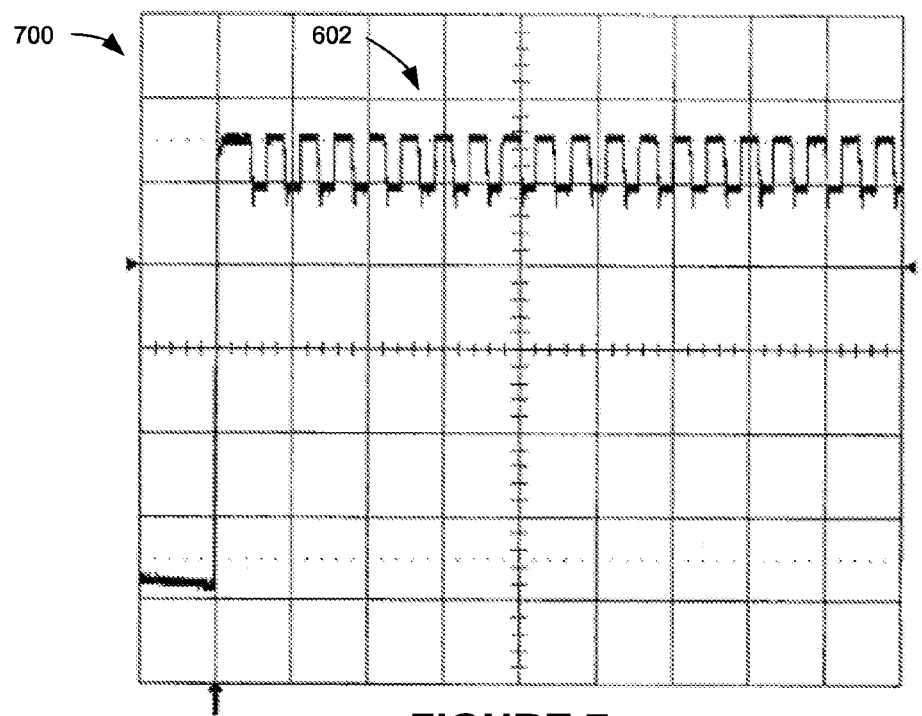
FIG. 7 illustrates an example signal diagram of an injector tone signal.

FIG. 6 illustrates an example signal diagram of power signal 600 with an injector tone. As can be observed from FIG. 6, a tone signal 602 is sent shortly after the power supply achieves its rated voltage, which in this example is 56V. After 100 msec, the tone signal stops and the regular power signal is received as illustrated at 604. FIG. 7 illustrates an example detailed signal diagram 700 of injector tone signal 602.

What has been described above includes example implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims interpreted in accordance with the breadth to which they are fairly, legally and equitably entitled.

The invention claimed is:

1. A system, comprising:
   a signal detector coupled to an external power source; and
   control logic coupled to the signal detector and the external power source;
   wherein the signal detector is configured to ascertain whether a predetermined signal was received from the external power source; and
   wherein the control logic is responsive to the signal detector to determine a characteristic of the external power source based on whether the signal detector detected the predetermined signal.

2. The system according to claim 1, wherein the signal detector is configured to determine at least one characteristic of the predetermined signal and the control logic is responsive to the signal detector to determine the characteristic of the external power source based on the at least one characteristic.

3. The system according to claim 2, wherein the at least one characteristic is one of a group consisting of frequency, amplitude and duration of the predetermined signal.

4. The system according to claim 3, wherein the at least one characteristic is two of the group consisting of frequency, amplitude and duration of the predetermined signal.

5. The system according to claim 2, wherein the at least one characteristic includes frequency, amplitude and duration of the predetermined signal.

6. The system according to claim 1, wherein the signal detector determines whether the predetermined signal is present during a predetermined time period.

7. The system according to claim 6, the signal detector further comprises:
   a controllable switching device coupled to the microcontroller;
   a resistance coupled to the controllable switching device;
   wherein the controllable switching device switches on to conduct current responsive to a signal from the microcontroller.

8. The system according to claim 7, wherein the microcontroller switches on the controllable switching device while ascertaining whether the predetermined signal is present and switches off the controllable switching device when not ascertaining whether the predetermined signal is present.

9. The system according to claim 7, wherein the signal detector has an input resistance and wherein the input resistance is less when the controllable switching device is turned on than when the controllable switching device is turned off.

10. The system according to claim 1, the signal detector comprises:

a power supply coupled to the external power supply and operative to provide power when power is being supplied by the external power supply;

a microcontroller coupled to the power supply;

a analog to digital converter having an input and an output, the output coupled to the microcontroller; and a resistive network coupling the input of the analog to digital converter to the external power source wherein the microcontroller is responsive to the output of the analog to digital converter to determine whether the predetermined signal is present.

11. The system according to claim 10, wherein the power supply is a direct current power supply and the predetermined signal is an alternating current signal.

12. The system according to claim 11, wherein the signal detector determines the predetermined signal is present when a signal with a matching frequency, amplitude and duration is detected by the analog to digital converter during a predetermined time period.

13. The system according to claim 12, wherein the predetermined time period is the first one hundred milliseconds of power being received from the external power source.

14. The system according to claim 1, further comprising:

at least one module coupled to the control logic;

wherein the control logic is responsive to determine which of the at least one module is powered based on whether the signal detector detected the predetermined signal.

15. An apparatus, comprising:

a power over Ethernet input configured to receive power from an external power supply via an Ethernet connection;

signal detection logic configured for determining whether a predetermined signal is received from the external power supply;

control logic coupled to the signal detection logic and the external power supply, the control logic is responsive to the signal detection logic to determine a characteristic of the power being supplied by the external power supply based on whether the signal detection logic detected the predetermined signal; and at least one wireless transceiver;

wherein the control logic is configured to control the operation of the at least one wireless transceiver based on the characteristic of the power being supplied by the external power supply.

16. An apparatus according to claim 15, wherein the signal detection logic determines whether the predetermined signal is received from the external power supply based on whether a signal with a predetermined frequency, predetermined amplitude and predetermined duration is received from the external power supply during a predetermined time period.

17. A method, comprising:

receiving power from an external power source;

determining whether a predetermined signal from the external power source is detected; and based on whether the predetermined signal is detected, determining a characteristic of the power being supplied.

18. A method according to claim 17, further comprising using a default power setting responsive to not detecting the predetermined signal.

19. A method according to claim 17, further comprising:

based on whether the predetermined signal is detected, selecting at least one module from a plurality of modules for receiving power; and providing power to the selected at least one module.

20. A system, comprising:

means for receiving power from an external power source;

means for determining whether a predetermined signal from the external power source is detected; and means for determining a characteristic of the power being supplied responsive to the means for determining whether a predetermined signal from the external power source is detected.

21. A system according to claim 20, further comprising means for applying a default power setting responsive to the means for determining whether a predetermined signal from the external power source is detected not detecting the predetermined signal.

22. A system according to claim 20, further comprising:

means for selecting at least one module from a plurality of modules for receiving power responsive to whether the predetermined signal is detected by the means for determining whether a predetermined signal from the external power source is detected; and means for providing power to the selected at least one module.

23. A system, comprising:

a power source;

control logic coupled to the power source; and a signal generator coupled to the power source and the control logic;

wherein the signal generator is responsive to the control logic to generate a signal indicative of a characteristic of the power source, the signal having a predetermined frequency, a predetermined amplitude and a predetermined duration generated at a predetermined time.

* * * * *